US009612165B2

(12) United States Patent
Karas et al.

(10) Patent No.: US 9,612,165 B2
(45) Date of Patent: Apr. 4, 2017

(54) MULTI-DIRECTIONAL IN-DUCT COMBINING AIR-TEMPERATURE MONITOR

(71) Applicant: Ford Global Technologies, LLC, Dearborn, MI (US)

(72) Inventors: Lawrence C. Karas, New Boston, MI (US); Mukesh Kumar, Canton, MI (US); Eric R. Yerke, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 14/289,734

(22) Filed: May 29, 2014

(65) Prior Publication Data

US 2015/0346041 A1 Dec. 3, 2015

(51) Int. Cl.
*G01K 13/02* (2006.01)
*G01K 3/06* (2006.01)

(52) U.S. Cl.
CPC ....... *G01K 13/02* (2013.01); *G01K 2013/024* (2013.01)

(58) Field of Classification Search
CPC ....... G01K 2013/024; G01K 2013/026; G01K 3/06
USPC .......................................................... 374/138
See application file for complete search history.

(56) References Cited

U.S. PATENT DOCUMENTS

| | | | |
|---|---|---|---|
| 3,656,541 A | 4/1972 | Coyle et al. | |
| 4,170,138 A * | 10/1979 | Wiebe | G01K 5/025 29/450 |
| 4,265,115 A * | 5/1981 | Stuhr | G01K 13/02 236/91 G |
| 5,106,203 A | 4/1992 | Napoli et al. | |
| 5,226,729 A | 7/1993 | Alford | |
| 5,533,348 A | 7/1996 | Baldwin et al. | |
| 5,927,380 A | 7/1999 | Scoccia | |
| 6,406,180 B1 * | 6/2002 | Walker | G01W 1/17 165/11.1 |
| 7,147,369 B2 * | 12/2006 | Gadonniex | G01K 1/16 374/185 |
| 7,985,021 B2 * | 7/2011 | Bard | G01K 3/06 374/138 |

(Continued)

FOREIGN PATENT DOCUMENTS

| | | | | |
|---|---|---|---|---|
| EP | 0299703 | | 1/1989 | |
| GB | 734702 A | * | 8/1955 | ........... F01D 17/085 |
| JP | 59171823 A | * | 9/1984 | |

*Primary Examiner* — Minh Phan
*Assistant Examiner* — Leon W Rhodes, Jr.
(74) *Attorney, Agent, or Firm* — Vichit Chea; Price Heneveld LLP

(57) ABSTRACT

A combining air-temperature monitor includes a faceted central shaft, a plurality of air-foil rings positioned about the faceted central shaft and a mixing zone proximate the faceted central shaft. The air-foil rings and the faceted central shaft cooperate to direct a plurality of air streams into the mixing zone. A temperature sensor is disposed within the mixing zone. The temperature sensor selectively measures a combined temperature of the plurality of air streams within the mixing zone. The faceted central shaft is adapted for insertion into an air-handling duct, wherein the faceted central shaft is free of a predetermined rotational orientation within the air handling duct.

16 Claims, 6 Drawing Sheets

(56) References Cited

U.S. PATENT DOCUMENTS

| | | | | |
|---|---|---|---|---|
| 8,656,755 B2* | 2/2014 | Bohl | ................. | G01K 3/06 |
| | | | | 374/142 |
| 9,234,807 B2* | 1/2016 | Kubiak | ................. | G01K 13/02 |
| 2004/0103679 A1 | 6/2004 | Ichishi et al. | | |
| 2013/0070806 A1* | 3/2013 | Kubiak | ................. | G01K 13/02 |
| | | | | 374/148 |

* cited by examiner

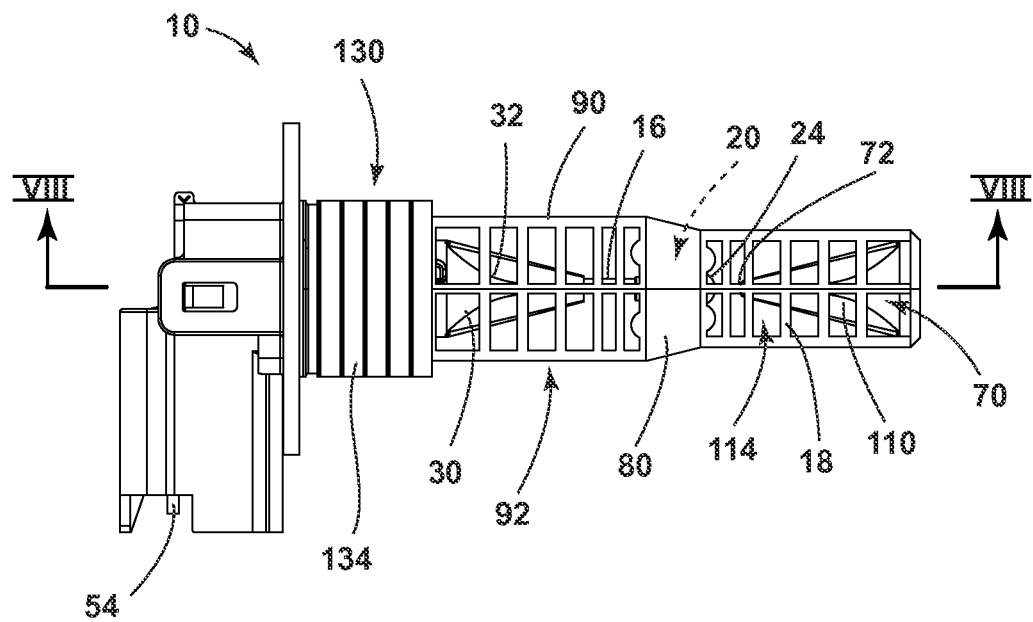
FIG. 5
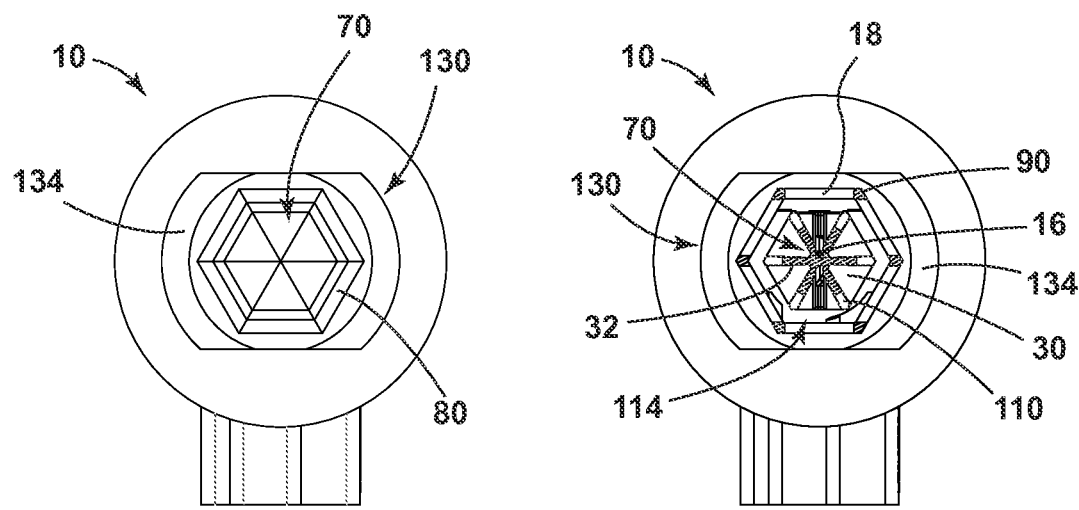
FIG. 6
FIG. 7

MULTI-DIRECTIONAL IN-DUCT COMBINING AIR-TEMPERATURE MONITOR

FIELD OF THE INVENTION

The present invention generally relates to temperature sensors for vehicle air ducts, and more specifically, a combining air temperature monitor that is free of a rotational orientation when positioned within a vehicular air duct.

BACKGROUND OF THE INVENTION

Various automobiles include temperature sensors disposed within the air handling ducts for the heating, ventilation and air conditioning (HVAC) system for a vehicle. These temperature sensors can be configured to monitor the temperature of the air flowing through the air ducts, such that climate control systems within vehicles can operate to deliver a predetermined temperature of air throughout the passenger cabin of the vehicle. Typically, several temperature sensors are placed throughout the various air ducts within the vehicle.

SUMMARY OF THE INVENTION

According to one aspect of the present invention, an in-duct combining air-temperature monitor includes a faceted central shaft, a plurality of air-foil rings positioned about the faceted central shaft and a mixing zone proximate the faceted central shaft. The air-foil rings and the faceted central shaft cooperate to direct a plurality of air streams into the mixing zone. A temperature sensor is disposed within the mixing zone. The temperature sensor selectively measures a combined temperature of the plurality of air streams within the mixing zone. The faceted central shaft is adapted for insertion into an air-handling duct, wherein the faceted central shaft is free of a predetermined rotational orientation within the air-handling duct.

According to another aspect of the present invention, a combining air-temperature monitor includes a plurality of air-foil rings positioned about a central axis and a mixing zone proximate the central axis. The air-foil rings direct a plurality of air streams into the mixing zone and a temperature sensor is disposed within the mixing zone. The air-temperature monitor selectively measures a combined temperature of the plurality of air streams within the mixing zone.

According to another aspect of the present invention, a combining air-temperature monitor includes a faceted central shaft and a mixing zone disposed proximate the faceted central shaft. The faceted central shaft directs a plurality of air streams to the mixing zone and a temperature sensor is disposed within the mixing zone. The temperature sensor is adapted to measure a combined temperature of the plurality of air streams within the mixing zone.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a second side elevational view of the combining air-temperature monitor of FIG. 3;

FIG. 6 is an end elevation view of the combining air-temperature monitor of FIG. 3;

FIG. 7 is a cross-sectional view of the combining air-temperature monitor of FIG. 4 taken at line VII-VII;

DETAILED DESCRIPTION OF THE PREFERRED EMBODIMENTS

Figure 1:
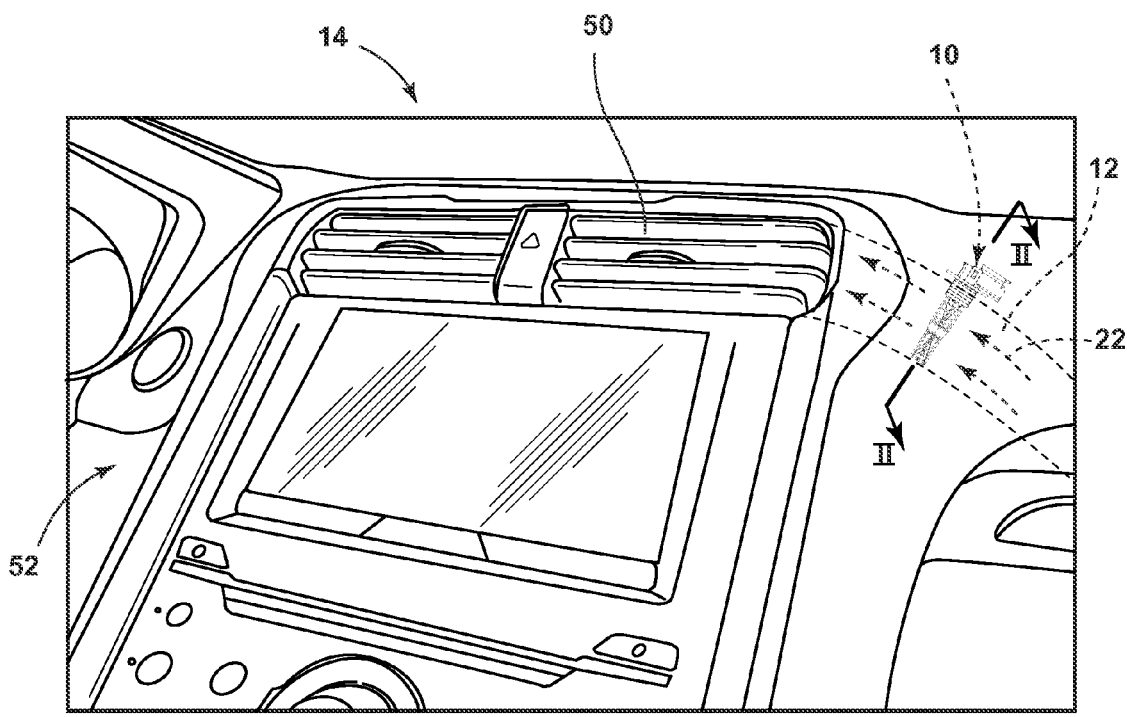
FIG. 1 is a front perspective view of a portion of the dashboard ventilation system of a vehicle, with one embodiment of the combining air-temperature monitor installed therein.
Figure 2:
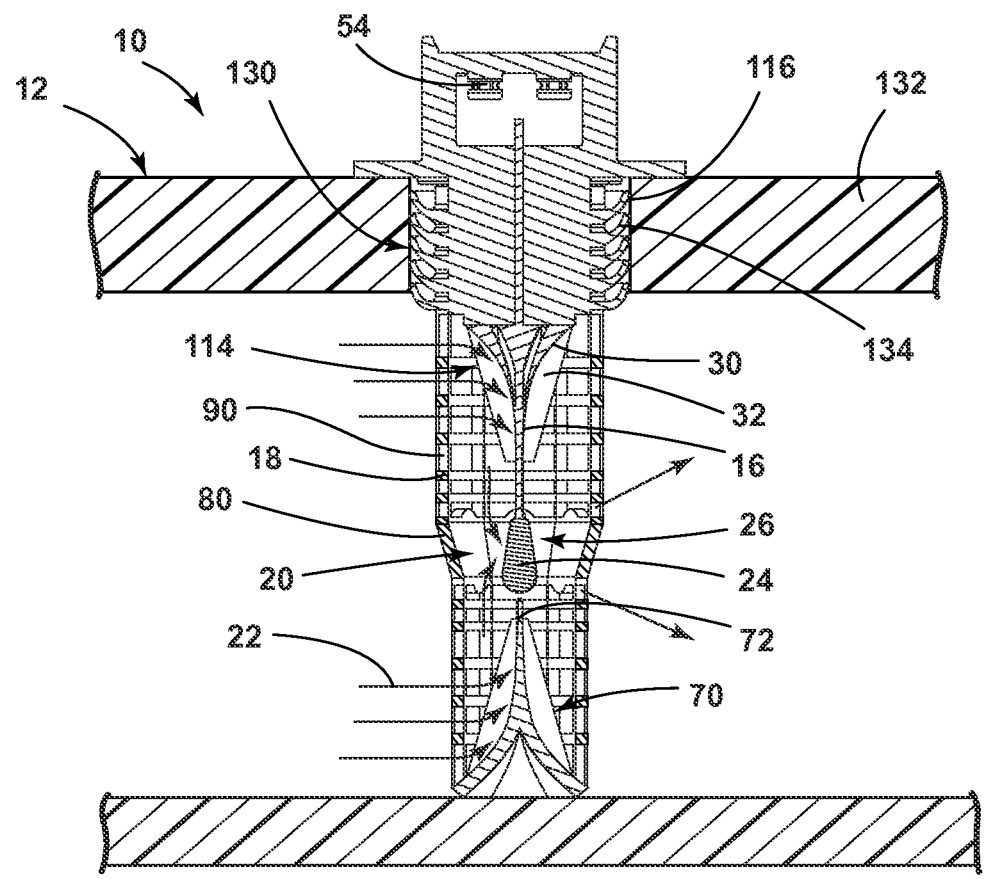
FIG. 2 is a cross-sectional schematic of one embodiment of the combining air-temperature monitor of FIG. 1 taken at line II-II, showing the directional flow of air through the mixing zone of the combining air-temperature monitor.
Figure 3:
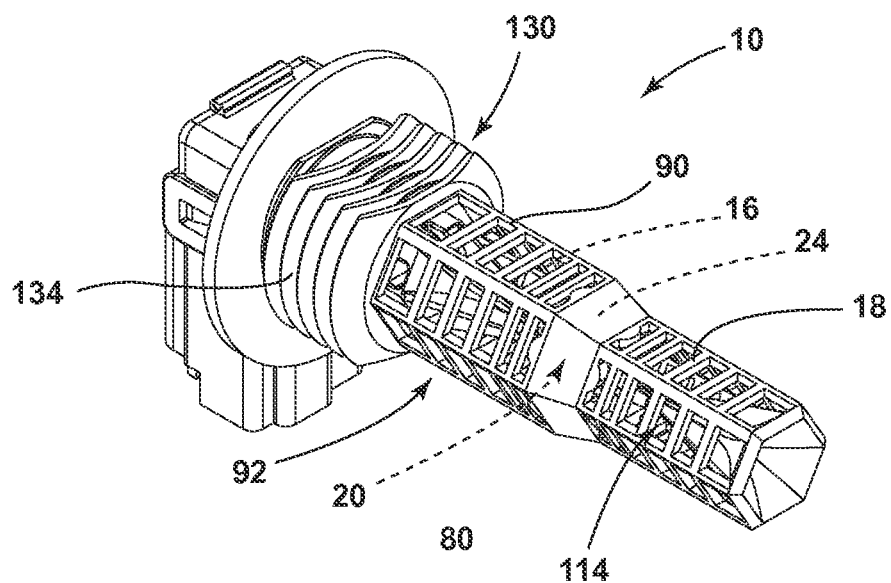
FIG. 3 is a perspective view of one embodiment of a combining air-temperature monitor.
Figure 4:
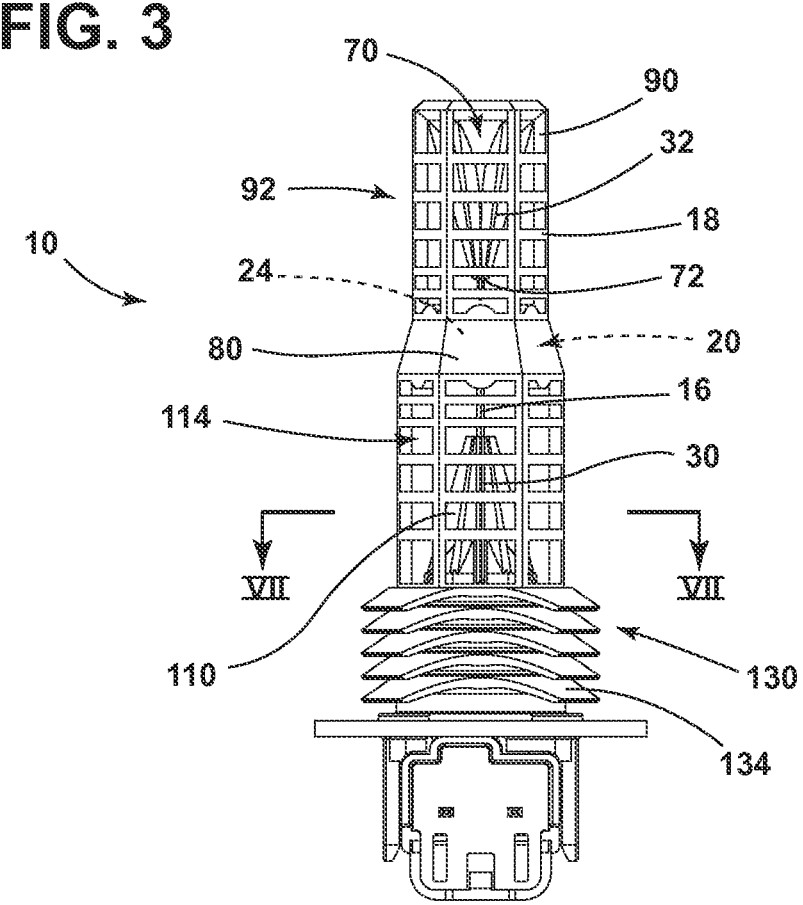
FIG. 4 is a side elevational view of the combining air-temperature monitor of FIG. 3.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to an in-duct combining air-temperature monitor for an air duct 12 within a vehicle 14, according to one embodiment. The combining air-temperature monitor 10 includes a faceted central shaft 16, and a plurality of air-foil rings 18 that are positioned about the faceted central shaft 16. A mixing zone 20 is positioned proximate the faceted central shaft 16. The air-foil rings 18 and the faceted central shaft 16 cooperate to direct a plurality of air streams 22 into the mixing zone 20 of the combining air-temperature monitor 10. A temperature sensor 24 is disposed within the mixing zone 20 such that the temperature sensor 24 selectively measures a combined temperature 26 of the plurality of air streams 22 within a mixing zone 20. The faceted central shaft 16 is adapted for insertion into an air duct 12 such that the faceted central shaft 16 is free of a predetermined rotational orientation within the air duct 12. It is contemplated that each facet 30 of the faceted central shaft 16 includes at least one fluted portion 32, wherein each fluted portion 32 is adapted to direct at least one air stream 22 to the mixing zone 20 of the combining air-temperature monitor 10.

Referring again to FIGS. 1-2, the combining air-temperature monitor 10 is disposed within the air ducts 12 of a vehicle 14 proximate air vents 50 disposed within a portion of the passenger cabin 52. As the plurality of air streams 22 are delivered through the air ducts 12 toward the air vent 50, the temperature sensor 24 measures the temperature of the air about to leave the air vent 50 and into the passenger cabin 52. Electrical contacts 54 of the combining air-temperature monitor 10 are adapted to deliver temperature readings gathered by the temperature sensor 24 regarding the air being delivered to the passenger cabin 52 to portions of the vehicle 14 that operate the HVAC system. Where the air in the air duct 12 is too warm, cooler air can be added to the plurality of air streams 22 to decrease the temperature of the air in the air duct 12 to a predetermined temperature. Similarly, where the air in the air duct 12 is too cool, heated air can be added to the plurality of air streams 22 to raise the temperature of the air being delivered to the passenger cabin 52. In this manner, the operator or passenger of the vehicle 14 can make fine adjustments to the HVAC system of the vehicle 14 in order to deliver a predetermined temperature of air to portions of the passenger cabin 52. Where desired, passengers within specific portions of the passenger cabin 52 can select various predetermined air temperatures. In this manner, air being delivered to each of the portions of the passenger cabin 52 can have the same or different predetermined air temperatures. Accordingly, each of the air ducts 12 that deliver air to the various portions of the passenger cabin 52 can be configured to include a dedicated combining air-temperature monitor 10 for assisting in heating and cooling the air being delivered.

Referring again to FIGS. 3-9, the combining air-temperature monitor 10 can include at least one conical portion 70 of the faceted central shaft 16 that is configured to taper towards the mixing zone 20. In the various embodiments, the mixing zone 20 and the temperature sensor 24 are positioned proximate the end 72 of the at least one conical portion 70. It is further contemplated that the faceted central shaft 16 can include two opposing conical portions 70 that taper toward the mixing zone 20. In such an embodiment, the mixing zone 20 is positioned between the two opposing conical portions 70. The shape of the faceted central shaft 16 is adapted to direct air moving through the air duct 12 of the vehicle 14 toward the mixing zone 20 of the combining air-temperature monitor 10. In this manner, the plurality of air streams 22 that move through the air duct 12 can each be substantially directed to the mixing zone 20 and combined within the mixing zone 20 such that a combined temperature 26 of all of the plurality of air streams 22 can be recorded by the temperature sensor 24.

Referring again to FIGS. 6-9, the faceted central shaft 16 of the combining air-temperature monitor 10 can include a predetermined number of facets 30. As illustrated, the faceted central shaft 16 includes six facets 30. In various alternate embodiments, more or fewer facets 30 can be included within the faceted central shaft 16, where a number of facets 30 and fluted portions 32 within the faceted central shaft 16 to be determined by the configuration of the air duct 12 into which the combining air-temperature monitor 10 is positioned. It is contemplated that, in various embodiments, each facet 30 can include multiple fluted portions 32 for directing the air streams 22 to the mixing zone 20. The number of facets 30 and fluted portions 32 can also be determined by the position of the air duct 12 within the vehicle 14, the size of the air duct 12, the amount of air designed to move through the air duct 12, and other various considerations that can bear on the number of air streams 22 that move through the air duct 12 and other various considerations.

Referring again to FIGS. 3-9, the plurality of air-foil rings 18 of the combining air-temperature monitor 10 can include a cover portion 80 positioned proximate the mixing zone 20. It is contemplated that the cover portion 80 can be adapted to at least partially enclose the mixing zone 20. In this manner, as the air-foil rings 18 and the faceted central shaft 16 direct the plurality of air streams 22 toward the mixing zone 20, the cover portion 80 of the air-foil rings 18 substantially detains the plurality of air streams 22 that are directed within the mixing zone 20. Accordingly, the plurality of air streams 22 can be substantially mixed so that the combined temperature 26 of the plurality of air streams 22 can be accurately determined. According to the embodiments illustrated in the figures, the cover portion 80 of the air-foil rings 18 includes a generally conical profile that narrows around the temperature sensor 24 of the combining air-temperature monitor 10. It is contemplated that, in various alternate embodiments, the cover portion 80 of the air-foil rings 18 can be a substantially cylindrical member that extends consistently around the temperature sensor 24. It is also contemplated that, in various embodiments, the cover portion 80 can have geometries such as, round, faceted, irregular, or other similar geometries.

Referring again to FIGS. 3-9, the air-foil rings 18 of the combining air-temperature monitor 10 include a plurality of faceted rings that extend around the faceted central shaft 16. Each of the air-foil rings 18 is held in place relative to one another by a plurality of lateral members 90 that extend between each of the air-foil rings 18. In this manner, the air-foil rings 18 and the lateral members 90 can cooperate to form a generally cylindrical or conical cage 92 extending around the faceted central shaft 16. In the various embodiments, it is contemplated that air-foil rings 18 can include a contoured surface 100 that can be generally oriented toward the mixing zone 20 of the combining air-temperature monitor 10. In such an embodiment, as the plurality of air streams 22 travel toward the combining air-temperature monitor 10 and engage one or more of the air-foil rings 18, the contoured surface 100 of each of the air-foil rings 18 can act on one or more of the plurality of air streams 22 to at least partially redirect one or more of the plurality of air streams 22 toward the mixing zone 20.

Referring again to FIGS. 2-9, the cage 92 of the combining air-temperature monitor 10 that is formed by the plurality of air-foil rings 18 and the lateral members 90 that secure each of the air-foil rings 18 in the predetermined position, are adapted to provide a structural enclosure for the faceted central shaft 16 of the combining air-temperature monitor 10. Additionally, the cage 92 formed by the air-foil rings 18 and the lateral members 90 can also prevent certain amounts of debris and other foreign particles from engaging portions of the combining air-temperature monitor 10 within the air-foil rings 18, wherein such debris may cause damage to the temperature sensor 24 or other aspects of the combining air-temperature monitor 10. It is further contemplated that the cage 92 formed by the air-foil rings 18 and the lateral members 90 can provide structural integrity to the combining air-temperature monitor 10 to substantially prevent deflection of the combining air-temperature monitor 10 that may be caused by high volumes of air moving through the air duct 12 and into the passenger cabin 52.

Figure 10:
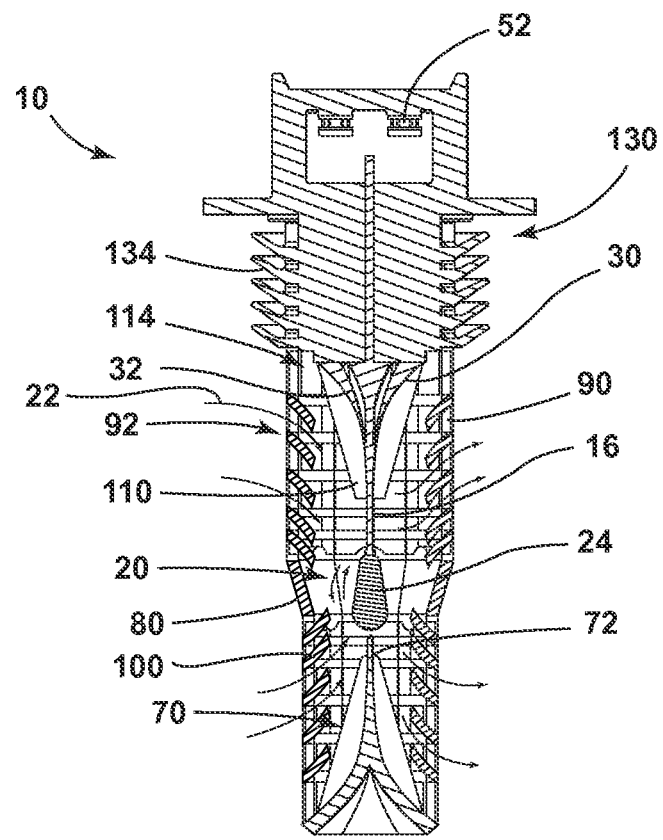
FIG. 10 is a cross-sectional view of an alternate embodiment of a combining air-temperature monitor with air-foil rings having contoured surfaces.

Referring now to FIG. 10, in various embodiments, the combining air-temperature monitor 10 can include the plurality of air-foil rings 18, each having contoured surfaces 100 that direct air towards a temperature sensor 24 disposed within a portion of the combining air-temperature monitor 10. In such an embodiment, the combining air-temperature monitor 10 may be created without a faceted central shaft 16. Accordingly, the plurality of air-foil rings 18 having a contoured surface 100 can be configured to direct air towards the temperature sensor 24. Accordingly, each of the air-foil rings 18 can be positioned about a central axis, with the temperature sensor 24 and the mixing zone 20 being located proximate the central axis.

Figure 8:
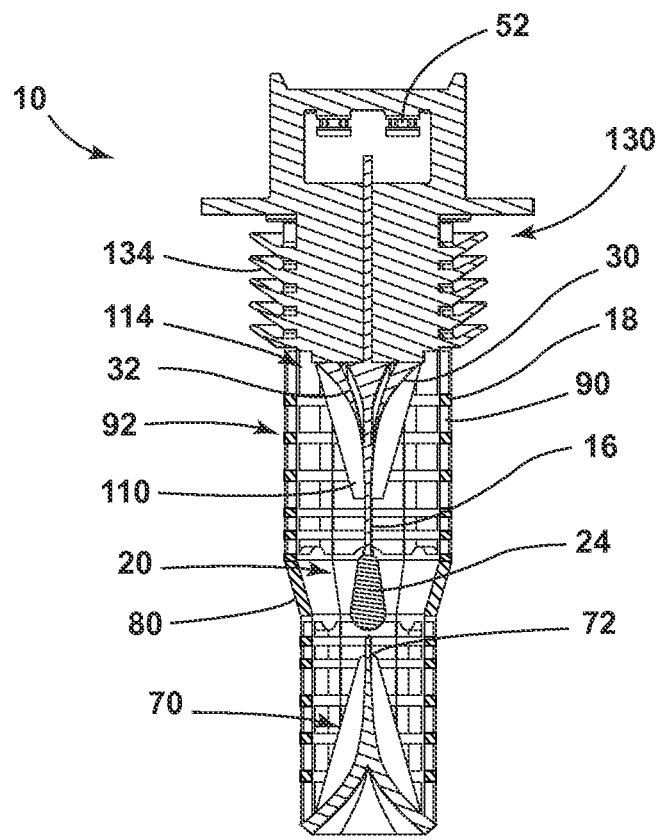
FIG. 8 is a cross-sectional view of the combining air-temperature monitor of FIG. 5 taken at line VII-VII.
Figure 9:
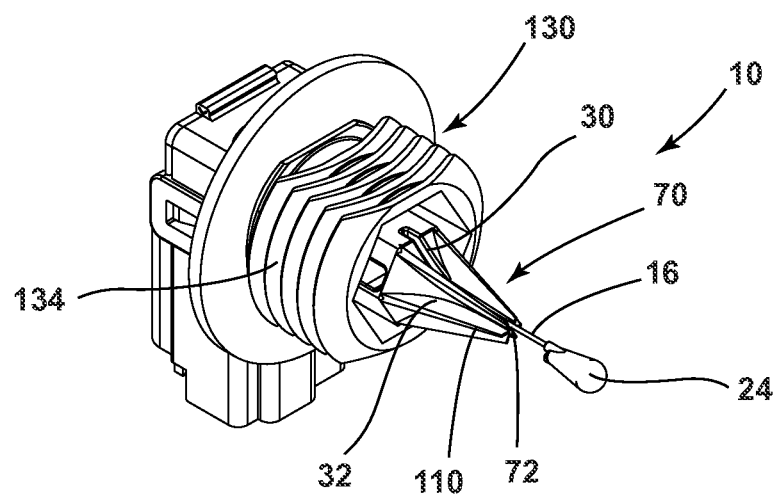
FIG. 9 is a partially exploded perspective view of the combining air-temperature monitor of FIG. 3 with outer portions of the combining air-temperature monitor removed.

Referring now to FIGS. 7-9, the faceted central shaft 16 of the combining air-temperature monitor 10 can include a plurality of flutes defined within the surface of the conical portions 70 that are adapted to direct at least one of the air streams 22 toward the mixing zone 20. In this embodiment, each of the flutes can generally narrow and taper towards an end 72 of the conical portions 70 to form the at least one conical section of the faceted central shaft 16. In this manner, each of the flutes is configured to capture at least a portion of the plurality of air streams 22, and redirect the air through each of the flutes and toward the temperature sensor 24 within the mixing zone 20 disposed at the end 72 of the conical portion 70 of the faceted central shaft 16.

In various embodiments, as illustrated in FIGS. 6-10, to increase the ability of each of the plurality of flutes to capture one or more of the plurality of air streams 22, the faceted central shaft 16 can include a plurality of fins 110 that are adapted to increase the size and depth of each of the flutes of the faceted central shaft 16. In this manner, the faceted central shaft 16 can have a greater capacity to funnel a portion of the plurality of air streams 22 into the mixing zone 20 of the combining air-temperature monitor 10.

Referring again to FIGS. 2-9, as the air streams 22 engage the combining air-temperature monitor 10, the air streams 22 enter the combining air-temperature monitor 10 between the air-foil rings 18 and into a central volume 114 of the combining air-temperature monitor 10. The air streams 22 then engage one or more of the flutes of the faceted central shaft 16. In this manner, the surface of each flute, which can be curved, tapered, sloped or otherwise contoured, operates to redirect the flow of the air streams 22 toward the mixing zone 20 of the combining air-temperature monitor 10. The temperature sensor 24 being disposed on at least a portion of the faceted central shaft 16 is positioned to engage the combined air streams 22 to measure the combined temperature 26.

In the various embodiments, the faceted central shaft 16 can include two opposed conical portions 70 that are each configured to direct the plurality of air streams 22 toward a mixing zone 20 disposed in the central volume 114 between the opposed and conical portions 70. In various alternate embodiments, the faceted central shaft 16 can include a single conical portion 70 that extends along the length of the faceted central shaft 16. In this embodiment, the mixing zone 20 of the combining air-temperature monitor 10 can be disposed at the end 72 of the single conical portion 70, such that the temperature sensor 24 is disposed at one end 72 of the combining air-temperature monitor 10 within the mixing zone 20 at the end 72 of the single conical section of the faceted central shaft 16.

Referring again to FIG. 2, once the plurality of air streams 22 are mixed within the mixing zone 20 such that the temperature sensor 24 can record a combined temperature 26 of the plurality of air streams 22, the combined plurality of air streams 22 are released through the opposing side of the combining air-temperature monitor 10 out through the plurality of air-foil rings 18. Because of the faceted arrangement of the air-foil rings 18, the flutes, and the facets 30 of the faceted central shaft 16, the combining air-temperature monitor 10 can be inserted within an air duct 12 of an HVAC system of the vehicle 14 in any rotational orientation. Accordingly, a single substantially circular hole 116 in the air duct 12 can be drilled and the combining air-temperature monitor 10 can be inserted within that substantially circular hole 116 in the air duct 12 for installation of the combining air-temperature monitor 10. Because of this installation process, wiring for the combining air-temperature monitor 10 can lead to the combining air-temperature monitor 10 from any direction. Additionally, the combining air-temperature monitor 10 can be turned to any rotational orientation within the air duct 12 to accommodate any section of air duct 12 within the vehicle 14, that may be disposed in various orientations.

Figure 11:
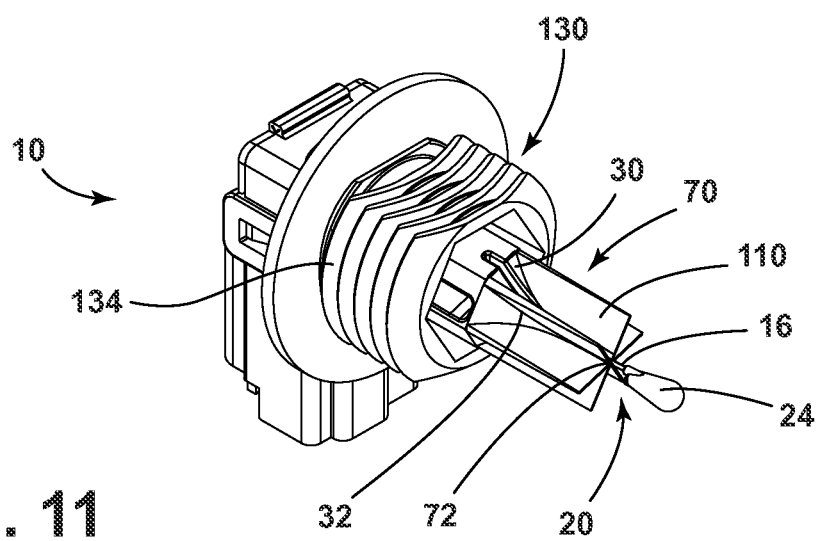
FIG. 11 is a partially exploded perspective view of an alternate embodiment of a combining air-temperature monitor.

Referring now to FIG. 11, it is contemplated that in various embodiments, the fins 110 of the faceted central shaft 16 can include rectangular fins 110 that extend proximate the plurality of air-foil rings 18 to extend the depth of each of the flutes of the faceted central shaft 16 to further increase the ability of each of the facets 30 to capture one or more of the plurality of air streams 22 that move through the air duct 12. It is also contemplated that the fins 110 of the faceted central shaft 16 can include various shapes and configurations that can include, but are not limited to, rectangular, tapered, triangular, curved, irregular, combinations thereof, and other configurations that are adapted to direct one or more of the plurality of air streams 22 toward the mixing zone 20 of the combining air-temperature monitor 10.

Referring again to FIG. 2, it is contemplated that of the plurality of air streams 22 that move through the air duct 12, at least one of the air streams 22 can include heated or cooled air from a heater or air conditioner of a vehicle 14, respectively. In various embodiments, the air streams 22 can include both heated and cooled air where a certain temperature of conditioned air is required to be provided to the passenger cabin 52. It is also contemplated that at least one of a plurality of air streams 22 can include a fresh air stream 22 that includes air taken from the outside of the vehicle 14. In this manner, at least a portion of the air provided to the passenger cabin 52 can be fresh air that has not been substantially recirculated through the HVAC system of the vehicle 14.

In various embodiments, it is contemplated that the combining air-temperature monitor 10 can include a faceted central shaft 16 with fins 110 that provide structural rigidity to the faceted central shaft 10 and that extend away from the faceted central shaft 16 to provide the structure for the combining air-temperature monitor 10. In such an embodiment, it is contemplated that the combining air-temperature monitor 10 can be manufactured without the plurality of air-foil rings 18 extending about the faceted central shaft 16. In such an embodiment, structural members can extend between the fins 110 of the faceted central shaft 16 to provide additional strength and integrity to the combining air-temperature monitor 10 during use.

Referring again to FIGS. 2-11, the combining air-temperature monitor 10 can include one or more retaining features 130 disposed at one end 72 of the combining air-temperature monitor 10 that are configured to engage the opening provided in the wall 132 of the air duct 12. In this manner, the retaining features 130 of the combining air-temperature monitor 10 allow for installation of the combining air-temperature monitor 10 into the opening of the air duct 12. Once installed, the retaining features 130 of the combining air-temperature monitor 10 provide a friction or interference fit within the air duct 12 such that the combining air-temperature monitor 10 is substantially secure within the air duct 12. The retaining features 130 of the combining air-temperature monitor 10 can include individual ribs 134 that are disposed at an angle leading away from the faceted central shaft 16, such that when the combining air-temperature monitor 10 is inserted within the opening of the air duct 12, the ribs 134 are biased toward the combining air-temperature monitor 10 to allow insertion into the opening of the air duct 12. Conversely, once at least one of the ribs 134 is disposed within the opening of the air duct 12, the angle of the ribs 134 provides an interference fit with the opening of the air duct 12 to prevent unintentional removal of the combining air-temperature monitor 10 from the opening in the air duct 12. In the various embodiments, it is contemplated that the retention features of the combining air-temperature monitor 10 can include various materials that can include, but are not limited to, plastic, rubber, polymers, combinations thereof, and other substantially flexible materials that are configured to provide a friction or interference fit within the opening of the air duct 12 of vehicle 14.

In the various embodiments, the components of the combining air-temperature monitor 10 can be made of substantially rigid materials that are configured to not deflect when engaging the plurality of air streams 22 that flow through the air duct 12. Such materials can include, but are not limited to, metal, plastic, composite, ceramic, combinations thereof, and other substantially rigid materials.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A combining air-temperature monitor comprising:
    a faceted central shaft;
    a plurality of air-foil rings positioned about the faceted central shaft;
    a mixing zone proximate the faceted central shaft, wherein the air-foil rings and the faceted central shaft cooperate to direct a plurality of air streams into the mixing zone; and
    a temperature sensor disposed within the mixing zone, wherein the temperature sensor measures a combined temperature of the plurality of air streams within the mixing zone, wherein the faceted central shaft is adapted for insertion into an air duct, and wherein the faceted central shaft is free of a predetermined rotational orientation within the air duct; and wherein the faceted central shaft is installed within an air duct of a vehicle, the plurality of air streams adapted to move through the air duct, and wherein each facet of the faceted central shaft includes at least one fluted portion, wherein each fluted portion is adapted to direct at least one air stream to the mixing zone.

2. The combining air-temperature monitor of claim 1, wherein the faceted central shaft includes two opposing conical portions that taper toward the mixing zone, and wherein the mixing zone is positioned between the two opposing conical portions.

3. The combining air-temperature monitor of claim 1, wherein the plurality of air-foil rings includes a cover portion positioned proximate the mixing zone, wherein the cover portion at least partially encloses the mixing zone.

4. A combining air-temperature monitor comprising:
    air-foil rings positioned about a central axis and directing a plurality of air streams into a mixing zone within the air-foil rings;
    opposing fluted conical portions within the air-foil rings that further direct the plurality of air streams to the mixing zone; and
    a temperature sensor within the mixing zone that measures a combined temperature of the plurality of air streams within the mixing zone.

5. The combining air-temperature monitor of claim 4, further comprising:
    a central shaft disposed proximate the central axis, wherein the temperature sensor is disposed proximate the central shaft.

6. The combining air-temperature monitor of claim 5, further comprising:
    a plurality of flutes defined within an outer surface of the central shaft, wherein the plurality of flutes directs the plurality of air streams into the mixing zone.

7. The combining air-temperature monitor of claim 5, wherein the opposing fluted conical portions are positioned along the central shaft and taper toward the mixing zone.

8. The combining air-temperature monitor of claim 4, wherein the air-foil rings are adapted to receive the plurality of air streams from any direction substantially perpendicular to the central axis for direction into the mixing zone.

9. The combining air-temperature monitor of claim 4, further comprising:
    a cover portion of the air-foil rings disposed proximate the mixing zone adapted to at least partially enclose the mixing zone.

10. The combining air-temperature monitor of claim 4, wherein the plurality of air-foil rings are adapted for insertion into an air-handling duct, and wherein the plurality of foil rings are free of a predetermined rotational orientation within the air-handling duct.

11. A combining air-temperature monitor comprising:
    a faceted central shaft that directs air streams to a mixing zone proximate the faceted central shaft;
    air-foil rings of the faceted central shaft that direct the air streams to the faceted central shaft, each facet having at least one fluted portion;
    a temperature sensor disposed within the mixing zone and adapted to measure a combined temperature of the air streams within the mixing zone.

12. The combining air-temperature monitor of claim 11, wherein the faceted central shaft includes at least one conical portion that tapers toward the mixing zone.

13. The combining air-temperature monitor of claim 12, wherein the at least one conical portion includes two opposing conical portions that taper toward the mixing zone, and wherein the mixing zone is positioned between the two opposing conical portions.

14. The combining air-temperature monitor of claim 11, wherein the faceted central shaft is adapted to receive the plurality of air streams from any direction substantially perpendicular to the faceted central shaft for direction into the mixing zone.

15. The combining air-temperature monitor of claim 11, wherein the plurality of air-foil rings includes a cover portion positioned proximate the mixing zone, wherein the cover portion at least partially encloses the mixing zone.

16. The combining air-temperature monitor of claim 11, wherein the faceted central shaft is adapted for insertion into an air-handling duct, and wherein the faceted central shaft is free of a predetermined rotational orientation within the air-handling duct.

\* \* \* \* \*